J. F. DUNIGAN.
TAP-WRENCH.

No. 177,820.  Patented May 23, 1876.

WITNESSES:
B. C. Pole
Elmore Martin

James F. Dunigan   INVENTOR.

C. S. Whitman   ATTORNEY.

UNITED STATES PATENT OFFICE.

JAMES F. DUNIGAN, OF DEERFIELD, ASSIGNOR TO WILEY & RUSSELL MANUFACTURING COMPANY, OF GREENFIELD, MASSACHUSETTS.

IMPROVEMENT IN TAP-WRENCHES.

Specification forming part of Letters Patent No. 177,820, dated May 23, 1876; application filed February 8, 1876.

*To all whom it may concern:*

Be it known that I, JAMES F. DUNIGAN, of Deerfield, county of Franklin, and State of Massachusetts, have invented certain Improvements in Tap-Wrenches.

The following description, taken in connection with the accompanying plate of drawings, hereinafter referred to, forms a full and exact specification, wherein are set forth the nature and principles of the invention, by which the same may be distinguished from others of a similar class, together with such parts thereof as are claimed as new and are desired to be secured by Letters Patent of the United States.

My invention relates to that class of tap-wrenches having adjustable jaws; and the nature thereof consists in the novel combination of the parts composing the same, as hereinafter described and shown.

Figure 1:
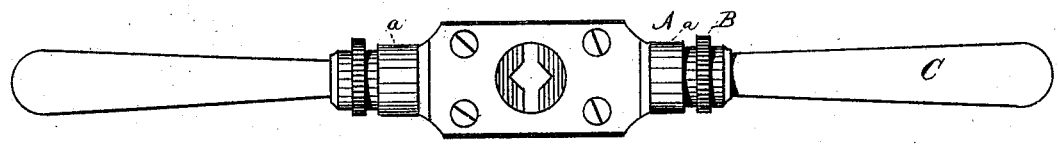
Figure 2:
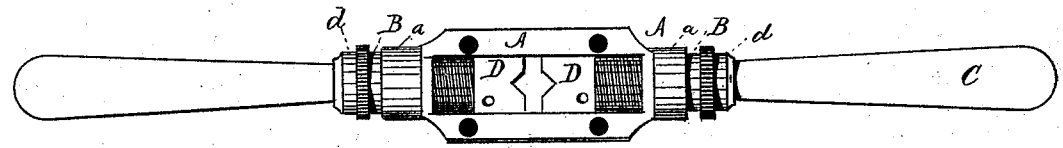
Figure 3:
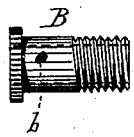
Figure 4:
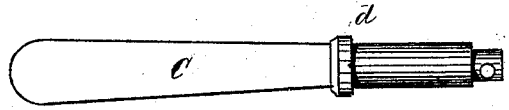
Figure 5:

In the accompanying plate of drawings, in which corresponding parts are designated by similar letters, Figure 1 illustrates the exterior of the wrench. Fig. 2 is a view with one of exterior plates removed. Fig. 3 represents the tubular screw, which actuates the jaw, detached from the implement. Fig. 4 is a view of one of the handles detached from the implement. Fig. 5 is a horizontal transverse section on line $x\ x$ of Fig. 2.

A designates the stock, upon each end of which are tubular projections $a$, for the reception of the collars B. V-threads are cut upon the exteriors of the collars B, which take into corresponding threads cut upon the interiors of the projections $a$. The said collars rotate upon the handles C, against shoulders $d$ cut thereon, and are provided with apertures $b$, for the reception of lubricating-oil. The cylindrical portions of the said handles, after passing through the said collars, are secured to the jaws D by means of pins, which pass through the said jaws and through slots cut in the said handles.

When the jaws are made to recede from each other, in order to adapt them to a large tap by rotating the collars, the handles also recede from each other, and the power of the implement is increased.

I claim and desire to secure by Letters Patent of the United States—

The combination of the stock, the collars, the jaws, and the handles attached to said jaw, as and for the purposes described.

In testimony that I claim the foregoing I have hereunto set my hand and seal this 14th day of January, 1876.

JAMES F. DUNIGAN. [L. S.]

Witnesses:
 GEO. TURNER,
 PHILIPP SEIBERT.